United States Patent [19]

Montgomery et al.

[11] Patent Number: 4,478,861
[45] Date of Patent: Oct. 23, 1984

[54] PREPARATION OF A FROZEN FOOD PRODUCT FOR LATER USE

[75] Inventors: F. Dorsey Montgomery, Milwaukee, Wis.; Allan A. Norin, Chicago, Ill.

[73] Assignee: Chef Automatique International Ltd., Gibralter

[21] Appl. No.: 369,926

[22] Filed: Apr. 19, 1982

[51] Int. Cl.³ ............................ A23B 7/04; A23B 7/16
[52] U.S. Cl. .................................. 426/295; 426/393; 426/524
[58] Field of Search ............... 426/295, 393, 114, 650, 426/285, 524, 289, 293, 615, 113

[56] References Cited

U.S. PATENT DOCUMENTS 3,415,664 12/1968 Montgomery ...................... 426/113
3,607,313 9/1971 Roth .................................... 426/302

Primary Examiner—George Yeung
Attorney, Agent, or Firm—Andrus, Sceales, Starke & Sawall

[57] ABSTRACT

A mixture of food pieces are first cooked. After the free water has been removed from the precooked food, leaving voids in the food mass, the food mass is agitated and the surfaces of the food pieces are treated so as to be partially frozen to thereby: (a) hold the basic shape of each piece without major deformation during agitation, and (b) leave a small amount of unfrozen moisture on the surface of each piece. Dry powdered uncooked adjuvant is then added to the food mass and, during further agitation, comes in contact with the partially frozen surface of each piece and is caused to adhere thereto by the attraction of the remaining moisture, causing a uniform coating of adjuvant to be applied to the food pieces. The resulting product is then fully frozen for deep freeze storage in a large container. Due to the uniform distribution of adjuvant throughout the food mass, subsequent reconstituting of any part thereof, or all of it at once, by the addition of free water and heat, will result in edible dishes which have the same basic proportions of ingredients. The food mass and the subsequently added adjuvant may be agitated by tumbling in a drum into which is introduced expanding $CO_2$ gas to provide the freezing function. The gas may be used to assist the introduction of adjuvant into the drum from an adjuvant storage hopper having a distributor at its lower end.

7 Claims, 10 Drawing Figures

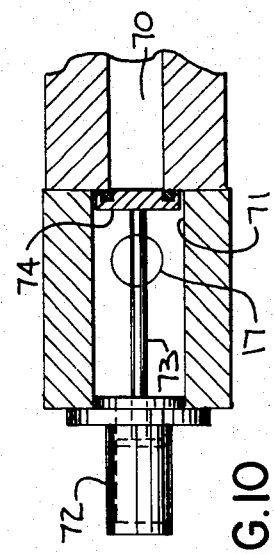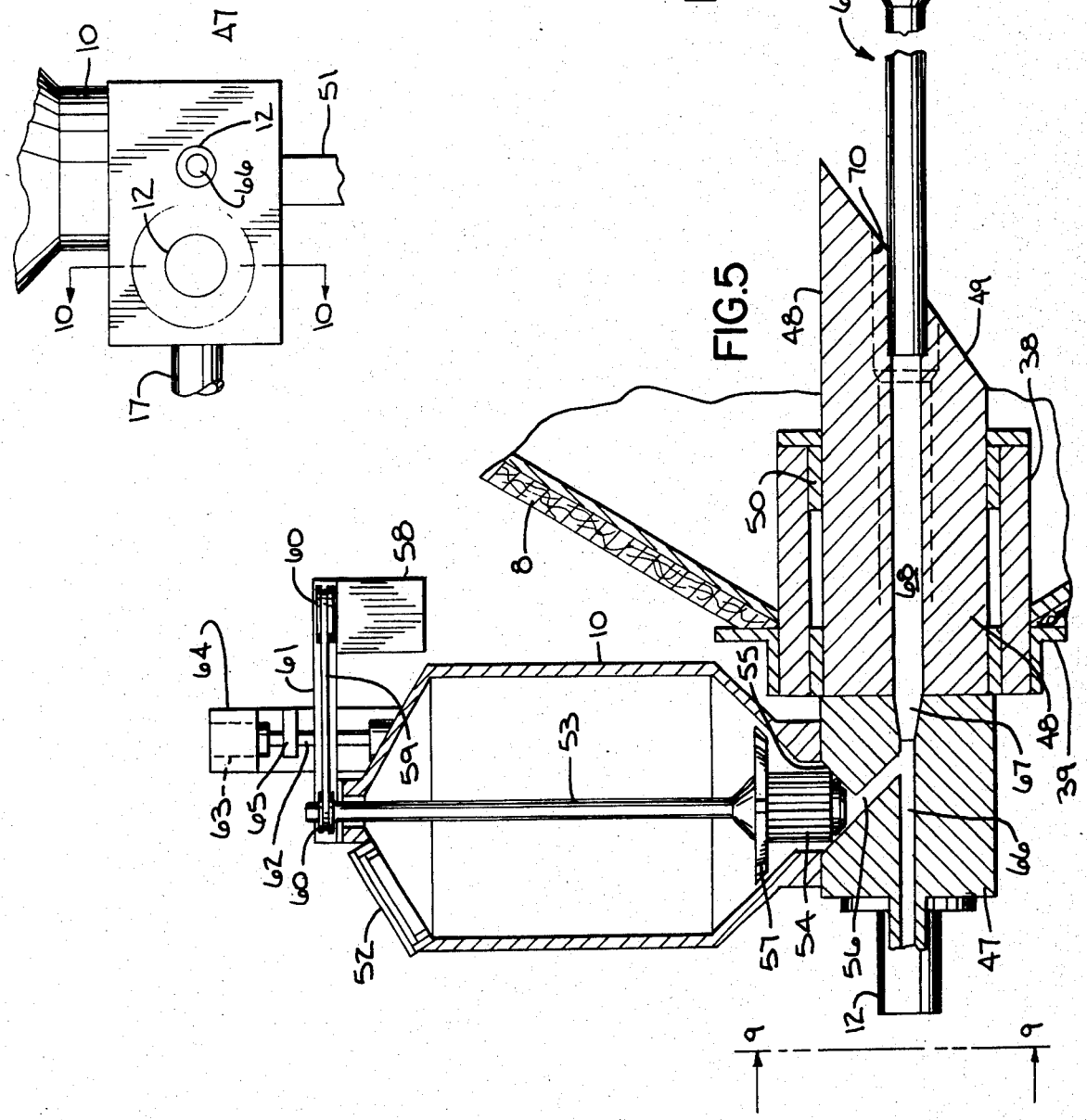

PREPARATION OF A FROZEN FOOD PRODUCT FOR LATER USE

BACKGROUND AND SUMMARY OF THE INVENTION

This invention relates to the preparation of a frozen food product for later use, and is based on an improvement over the concepts disclosed in one of the present inventors' U.S. Pat. No. 3,415,664 issued Dec. 10, 1968, the contents of which are incorporated herein by reference.

In said U.S. Pat. No. 3,415,664, there is disclosed the concept of cooking food pieces (such as meat, potatoes, carrots, peas or the like) in the presence of water. Substantially all of the free water present with the food pieces is then removed, leaving voids in the food mass. Then, the precooked food is collected into a water impervious container such as an aluminum pan or plastic bag. Subsequently, there is added to the food a mass of dry uncooked additives such as a dry powder adjuvant mix of materials which, when later reconstituted by the addition of free water, will provide flavoring, sauce, gravy or the like. Such a dry powder adjuvant may contain tomatoes, starch, onions, salt, hydrolysed vegetable protein, monosodium glutamate, spices and seasonings, etc. The container is then sealed and the food therein is then frozen while the aforesaid voids remain.

When the food is to be eaten, the container is unsealed and a desired amount of free water added to the food-adjuvant mixture and the entire mass heated. The added free water fills the voids and, as the water becomes hot throughout the mass, it dramatically shortens the time necessary to re-heat the mass to eating temperature. The free water also combines with the adjuvant to form the desired sauce, gravy or the like, as would be desired, for example, in beef stew.

The above concept is subject to the disadvantage that in thawing and reconstituting the frozen food-adjuvant mixture (as by the addition of free water and heating), the entire contents of the container must be utilized in order to obtain a final food product which contains all of the ingredients in their proper proportions in accordance with the original recipe. If only a portion of the container contents is removed and treated with free water and heated, the proportions will not normally be the same as in the recipe. This has been found to be due to an uneven distribution of adjuvant. Thus, the prior concepts are generally limited to the preparation of frozen food packages for subsequent individual serving.

It is a task of the present invention to substantially eliminate the aforementioned disadvantage so that the mass of precooked food and adjuvant can be packaged in bulk in frozen form in an economical large container in such a manner that any desired amount thereof can be removed from the container and reconstituted by free water and heat, as designated for example on an accompanying chart, while maintaining the original proportions of ingredients. Each of a plurality of batches of material so removed from the same container and reconstituted will have substantially the same proportions as every other batch and will closely conform to the original recipe.

In accordance with the various aspects of the invention, after any free water has been removed from the precooked food, leaving voids in the food mass, the food mass is agitated and the surfaces of the food pieces are treated so as to be partially frozen to thereby: (a) hold the basic shape of each piece without major deformation during agitation, and (b) leave a small amount of unfrozen moisture on the surface of each piece. Dry powdered uncooked adjuvant is then added to the food mass and, during further agitation, comes in contact with the partially frozen surface of each piece and is caused to adhere thereto by the attraction of the remaining moisture, causing a uniform coating of adjuvant to be applied to the food pieces. The resulting product is then fully frozen for deep freeze storage in a large container. Due to the uniform distribution of adjuvant throughout the food mass, subsequent reconstituting of any part thereof, or all of it at once, by the addition of suitable amounts of water and the application of heat, will result in edible dishes which have the same basic proportions of ingredients.

The food mass and the subsequently added adjuvant may be agitated by tumbling in a drum into which is introduced expanding $CO_2$ gas to provide the freezing function. The gas may be used to assist the introduction of adjuvant into the drum from an adjuvant storage hopper having a distributor at its lower end.

BRIEF DESCRIPTION OF THE DRAWINGS

The accompanying drawings illustrate the best mode presently contemplated by the inventors for carrying out the invention.

In the drawings:

FIG. 5 is an enlarged fragmentary vertical section through the adjuvant hopper and inlet into the tumbler drum;

FIG. 9 is a view taken on line 9—9 of FIG. 5; and

FIG. 10 is a view taken on line 10—10 of FIG. 9.

DESCRIPTION OF THE PREFERRED EMBODIMENT

Figure 1:
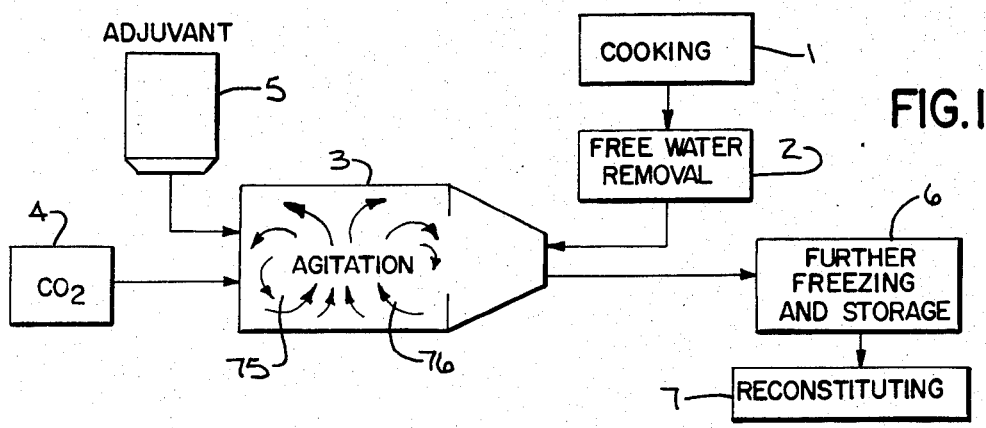
FIG. 1 is a schematic representation of the preparation of a frozen food product for later use in accordance with the various concepts of the invention.

FIG. 1 of the drawings is a broad schematic representation of parts of the process of preparing the frozen food product for later use. The food pieces are first cooked in the presence of water at a cooking station 1. Subsequently, the remaining free water is removed at station 2, leaving them moist but with voids in the food. The food pieces are then moved to an agitating station 3. As the moist pieces are agitated, they are subjected to a freezing environment, such as by the introduction of expanding $CO_2$ gas from a suitable source 4. Initially, the surfaces of the food pieces become only partially frozen which tends to rigidify their shape, but leaving a small amount of unfrozen surface moisture thereon. Dry powdered adjuvant from a source 5 is then introduced to the food pieces and, with continued agitation, adheres to the surface moisture and ultimately is uniformly distributed onto the pieces. Continuing introduction of $CO_2$ gas ultimately causes complete freezing of the pieces. They are then removed from station 3 and packaged in large sealed containers, such as plastic bags. These filled containers are then transported to one or more further stations, illustrated at 6, for a deep freezing operation and/or storage.

When the resultant frozen food product is to be used, all or part of the contents of a container is removed therefrom and positioned at a reconstituting station 7 where free water is added to the mass and heat applied. The free water fills the previously formed voids and heats the entire product very quickly.

FIGS. 2–10 illustrate a device to be used in treating the moist precooked food pieces after the free water has been removed and corresponds generally with station 3 and sources 4 and 5.

Figure 2:
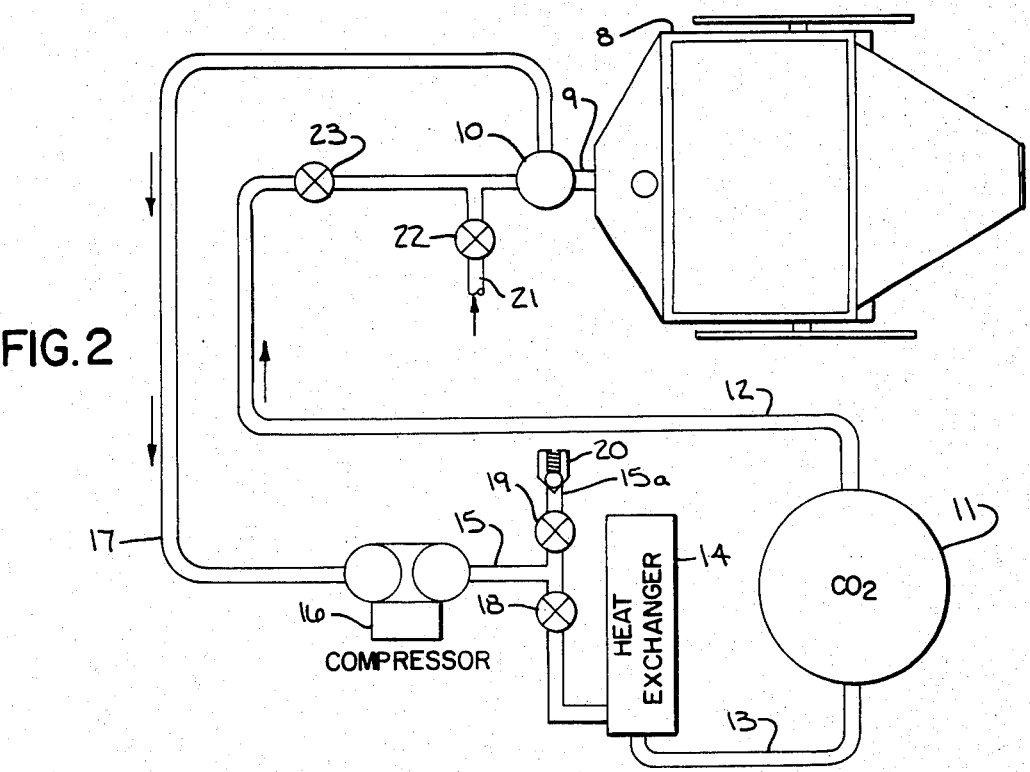
FIG. 2 is a schematic representation of an apparatus and controls used in the preparation of the frozen food product.

Turning first to FIG. 2, the food pieces are adapted to be placed in and agitated by a drum-like tumbler 8 which is rotatable about a horizontal axis and connected through a conduit element 9 to a vertical hopper 10 for containing adjuvant, normally at room temperature. A storage tank 11 for pressurized $CO_2$ gas is connected through a supply line 12 to hopper 10 and tumbler 8, as will be seen. Tank 11 is connected through a line 13 to a heat exchanger 14 and hence through a line 15 to a compressor 16. Compressor 16 is connected to a return line 17 coming from tumbler 8.

Line 15 has an on-off control valve 18 therein, and also has a branch line 15a containing an on-off control valve 19 and a pressure relief valve 20. A hot water inlet line 21 with control valve 22 is connected to line 12 for cleaning of tumbler 8. Line 12 also includes an on-off control valve 23.

Figure 3:
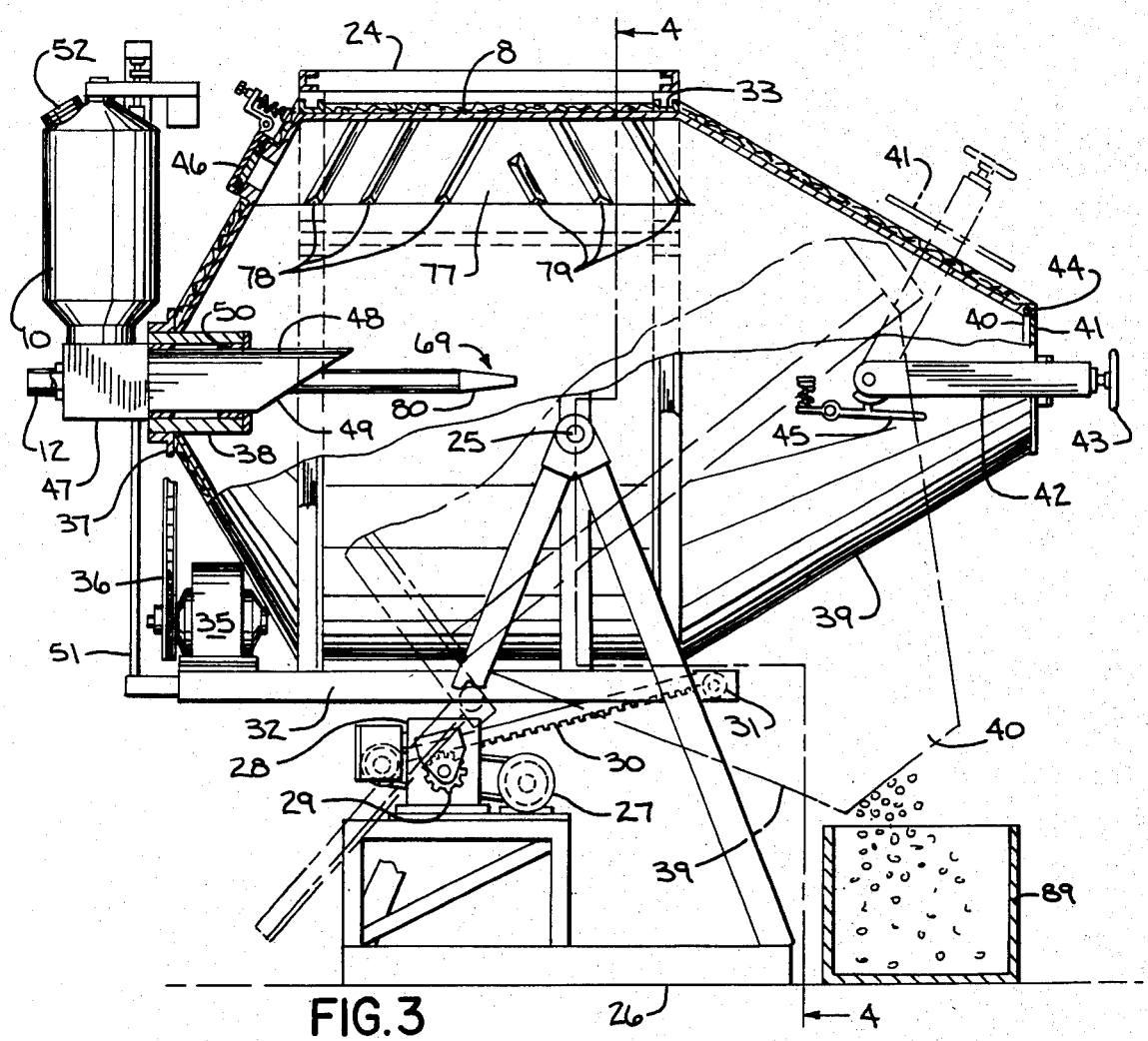
FIG. 3 is a side elevation of the apparatus with parts broken away and in section.
Figure 4:
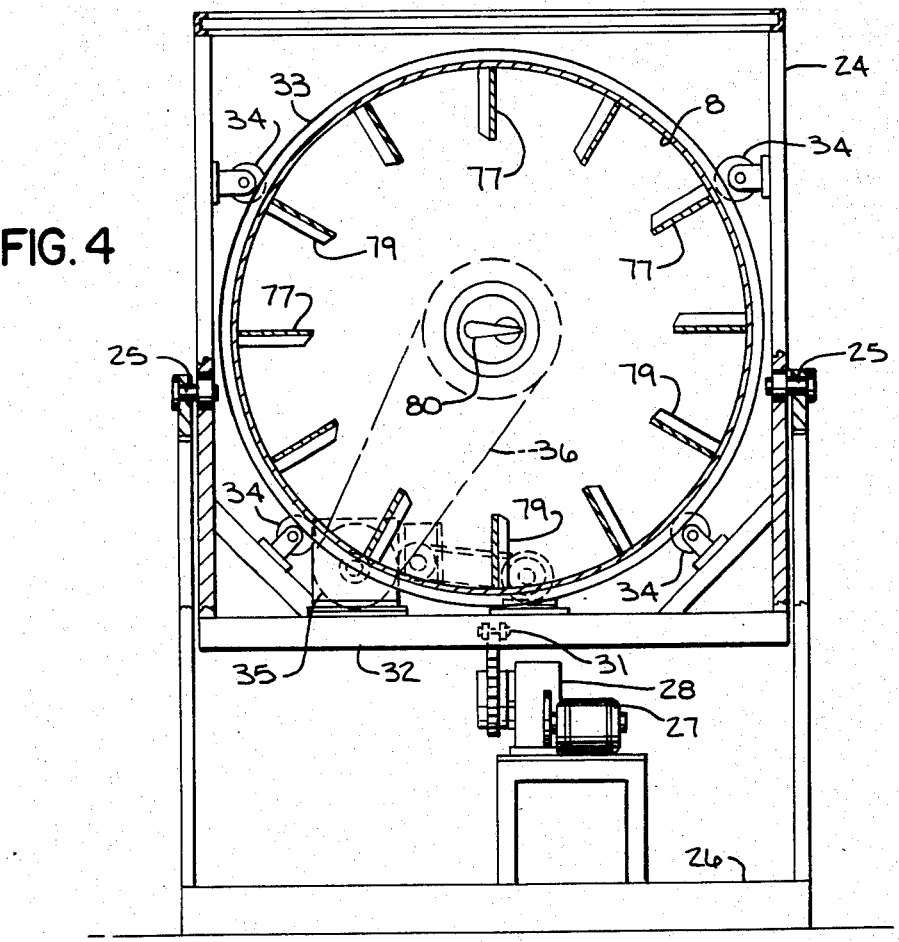
FIG. 4 is a vertical section taken on line 4—4 of FIG. 3.
Figure 6:
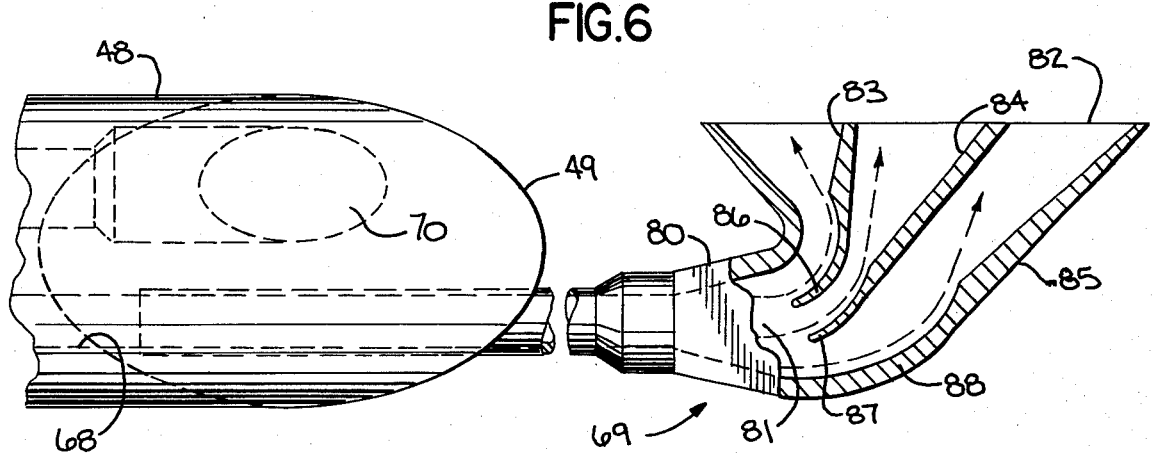
FIG. 6 is a top plan view of the inlet area with parts of the gas discharge nozzle broken away.
Figure 7:
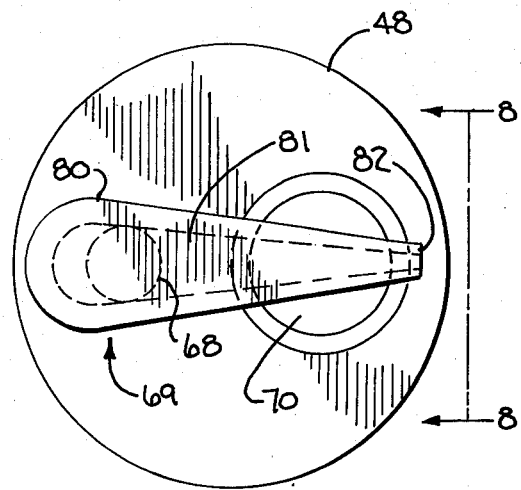
FIG. 7 is an end view of the inlet area.
Figure 8:
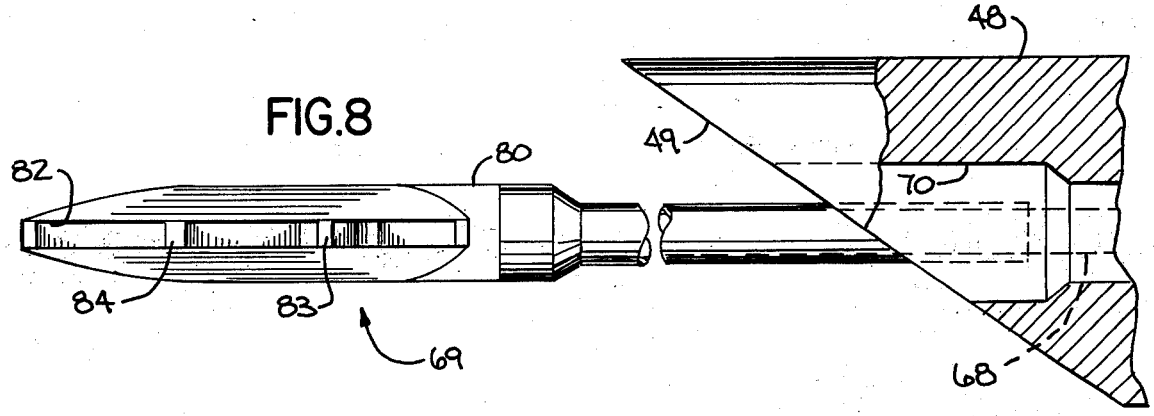
FIG. 8 is a rear view of the inlet area taken on line 8—8 of FIG. 7.

Referring to FIGS. 3–5, tumbler 8 forms an enclosed chamber and is mounted on a rectangular frame 24 which in turn is mounted on spindles 25 for rotation about a transverse horizontal axis. Spindles 25 connect to the upper arm portions of a base 26 which also carries a motor 27 connected to a speed reducer 28. Reducer 28 carries a pinion 29 meshing with a rack 30 which is pivotally connected at 31 to a beam 32 forming part of frame 24. Actuation of motor 27 causes tumbler 8 to pivot about spindles 25 between the two positions shown in FIG. 3.

Tumbler 8 is provided with circumferential outer tracks 33 which receive rollers 34 mounted to frame 24 to facilitate rotation of the tumbler about its longitudinal axis. Tumbler 8 is rotatably driven by a motor 35 mounted on beam 32 which connects through a chain 36 or the like to a gear 37 mounted to an axial sleeve 38 disposed at the inner tumbler end.

Tumbler 8 is provided with a conical front end wall portion 39 which terminates in an opening 40 having a removable closure door 41 connected via a yoke 42 to the tumbler wall. A tightening mechanism 43 and seals 44, as well as a spring-biased holding device 45, are provided for door 41 which is shown in two positions in FIG. 3.

Tumbler 8 is also provided with a spring-biased pressure relief valve or door 46 in its wall.

Adjuvant hopper 10, which is shown as external to tumbler 8, is mounted on a connector element 47 which in turn is connected to an axially inwardly extending shaft 48 having a 45° angled cut-back end portion 49. Shaft 48 extends through bearings 50 supporting sleeve 38. Connector 47 is held against rotation by a rod 51 extending downwardly to beam 32.

Hopper 10 is provided with a removable cover 52 for loading of dry powdered adjuvant thereinto. Furthermore, a vertical shaft 53 extends axially through hopper 10 and terminates at its lower end portion in a grooved cylindrical distributor 54 at the hopper bottom and which is adapted to sealingly engage a seat 55 formed in connector 47 and which forms the upper inlet portion of a passage 56. A plurality of vanes 57 are mounted to shaft 53 in the lower conical portion of hopper 10 and just above distributor 54.

Shaft 53 and its associated parts are adapted to be rotated by a motor-driven speed reducer 58 through a belt and pulley connection 59, 60 or the like. In addition, shaft 53 and its associated parts are adapted to be adjustably shifted vertically to selectively open or block the discharge of adjuvant. For this purpose, shaft 53 and speed reducer 58 are commonly mounted on a brace 61 which in turn is fixedly mounted to the piston 62 of an air cylinder 63 which is mounted to a frame 64 secured to hopper 10. When piston 62 is raised, carrying brace 61 with it, distributor 54 will be lifted off seat 55. The upward movement of brace 61 is limited by a stop 65 fixed on frame 64.

Referring particularly to FIGS. 5–10, connector 47 is provided with a horizontal gas flow passage 66 which connects at one end with gas supply line 12 and which intermediately connects with adjuvant discharge passage 56. The other end of gas passage 66 increases in cross sectional area at 67 and joins a horizontal passage 68 of like area extending through shaft 48. A nozzle 69 is connected to the outer end of passage 68. In addition, shaft 48 includes a second greatly enlarged horizontal passage 70 serving as a gas exhaust for tumbler 8. Passage 70 connects to a chamber 71 in connector 47 (which is normally open but which may be sealed during tumbler washing by an assembly comprising a cylinder 72, piston 73 and sealing member 74) and hence to gas return line 17. See FIGS. 9 and 10.

Once the precooked food pieces have their free water removed therefrom and possibly subsequent to storage thereof at 45° to 50° F., door 41 of tumbler 8 is lifted to its phantom position shown in FIG. 3 and the moist pieces are dumped into opening 40. Motor 35 is actuated to start tumbler 8 rotating. The food pieces are caused to be lifted and tumbled in a pair of adjacent oppositely rotating whorls 75, 76 (see FIG. 1), moving generally upwardly in the center and then axially outwardly over and down. This is accomplished by providing a plurality of circumferentially spaced longitudinally extending vanes 77 (see FIGS. 3 and 4) which have disposed thereon a plurality of spaced director ribs 78, 79. The series of ribs 78 are disposed along one half of each vane 77 and are inclined to form channels which force the rising food pieces toward one end of tumbler 8. By the same token, ribs 79 are disposed along the other half of each vane 77 and are inclined in the opposite direction to form channels which force the rising food pieces toward the other end of tumbler 8.

Subsequently, valve 18 is closed and valve 19 is opened and compressor 16 is energized, thus drawing air from the interior of tumbler 8 through return line 17 and forcing it through pressure relief valve 20. This serves to evacuate air from the tumbler and draw a light vacuum therewithin. Valve 19 is then closed and valves 18 and 23 opened so that pressurized $CO_2$ gas passes through supply line 12 to connector 47.

With distributor 54 initially sealed, the gas flows through passage 66, expands and cools slightly at 67, and then passes through passage 68 and hence through nozzle 69 which provides a substantial expansion and cooling of the gas, which then discharges into the tumbler and into contact with the tumbling food pieces. The gas pressure within tumbler 8 is preferably 3-4 ounces. The freezing process then begins and the outer surfaces of the pieces are first partially frozen by the gas. As previously stated, this tends to rigidify the pieces so they maintain their shape during tumbling, and also leaves a certain amount of unfrozen moisture on their surfaces. The partial freezing process is allowed to continue for a predetermined length of time.

Distributor 54 is then lifted and rotated, and as gas flows through passage 66, there will be a venturi suction effect created whereby the flowing gas draws adjuvant through passage 56 into passage 66 so that the two are henceforth joined. Upon reaching expanded portion 67, the gas continues to expand and cool, thus cooling the adjuvant. The gas carries the powdered adjuvant along through passage 68 and through nozzle 69.

As best seen in FIGS. 5–8, nozzle 69 is of unique construction and comprises an outwardly flared housing 80 providing a thin generally horizontal tapered chamber 81 of decreasing cross section toward the elongated nozzle outlet 82. Chamber 81 is provided with a plurality of baffles 83, 84 which run generally parallel to the outer housing wall 85 to create three sub-chamber portions. The inner end portions of baffles 83, 84 and wall 85 are provided with curved portions 86, 87, 88 respectively in the path of the flowing $CO_2$ gas and adjuvant. As the gas and adjuvant engage curved portions 86, 87, 88, a centrifugal force is created which causes the gas and adjuvant to move away from the respective baffle or wall and generally freely through the three sub-chamber portions with a minimum of friction before discharge. See the arrows in FIG. 6.

The cooled adjuvant is discharged from nozzle 69 and blown at high speed transversely of the tumbler axis and onto the tumbling partially frozen food particles, where it adheres to the surface moisture thereon. When a sufficient charge of adjuvant has entered tumbler 8, shaft 53 is lowered to close the outlet of hopper 10. $CO_2$ gas continues to flow into tumbler 8 until the uniformly coated food pieces are substantially more thoroughly and fully frozen throughout. The gas discharges through passage 70 and line 17. Valves 18 and 23 are then closed and compressor 16 deactivated.

Tumbler motor 35 is then stopped. Motor 27 is then activated to tilt tumbler 8 downwardly to the position shown in phantom in FIG. 3. Door 41 is opened and the now frozen food mass can be dumped by gravity through opening 40 into one or more suitable storage containers 89. The containers are then transported to stations 6 as previously described, for further freezing and/or storage. Later, any amount of food mass may be removed from a container and reconstituted at station 7, with the assurance that each mass so reconstituted will be substantially identical to any other reconstituted mass from the same container.

The concepts of the invention provide an improved system for preparation of frozen food for later use. The continuous addition of the adjuvant additives in controlled amounts, depending on the vertical setting of distributor 54, together with the adherence of the adjuvant to moisture on the partially frozen surfaces of the food pieces provides a desirably uniform product. The partial freezing of the surface of the food pieces also serves to rigidify the pieces against any substantial distortion thereof during subsequent tumbling, thereby reducing any tendency of the adhered adjuvant coating to fall off.

Various modes of carrying out the invention are contemplated as being within the scope of the following claims particularly pointing out and distinctly claiming the subject matter which is regarded as the invention.

We claim:

1. The method of preparing a frozen food product comprising the steps of:
   (a) cooking a plurality of food pieces in the presence of water,
   (b) thereafter removing substantially all of any existing free water present with the cooked food pieces to form voids in the precooked food mass while leaving the mass moist,
   (c) then agitating the said moist food mass while subjecting the mass to a freezing gas until the surfaces of the food pieces are partially frozen to rigidify the pieces but leave some unfrozen moisture thereon,
   (d) then introducing dry powdered additives to the partially frozen agitating food mass so that the additives uniformly coat and adhere to the said unfrozen moisture on the surfaces of the food pieces,
   (e) then continuing the agitation until the coated food pieces are substantially fully frozen throughout,
   (f) and subsequently transferring the frozen food pieces to a storage container for later reconstituting by the addition of free water and heat.

2. The method of claim 1 wherein said moist food mass is agitated by tumbling in an enclosed chamber.

3. The method of claim 2 which includes the step of drawing a slight vacuum in said chamber before subjecting said moist food mass to said freezing gas.

4. The method of claim 2 wherein said moist food mass is tumbled so that it forms a pair of oppositely rotating whorls.

5. The method of claim 2 wherein said dry powdered additives are continuously introduced into said enclosed chamber in controlled amounts.

6. The method of claim 5 wherein:
   (a) said freezing gas is introduced into said chamber through a nozzle,
   (b) and said additives are carried through said nozzle by said gas.

7. The method of claim 5 or 6 wherein:
   (a) said dry powdered additives are stored in a hopper externally of said enclosed chamber,
   (b) and said freezing gas draws said additives from said hopper by venturi suction and subsequently cools the additives.

* * * * *